(No Model.)
H. H. FRANZEN.
BROADCAST HAND SEEDER.
No. 490,956. Patented Jan. 31, 1893.
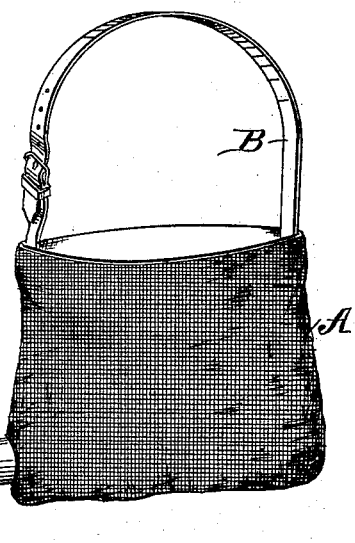
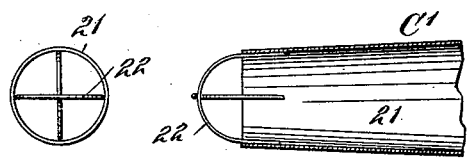
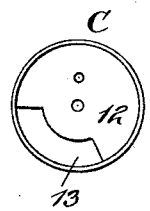 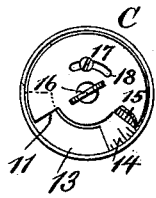 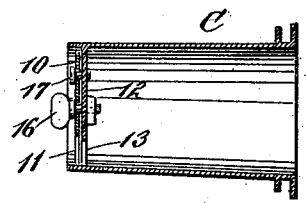
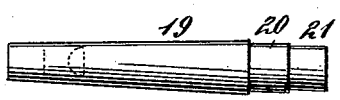
WITNESSES:
Chas. Nida
E. Sedgwick
INVENTOR
H. H. Franzen
BY Munn & Co.
ATTORNEYS.

UNITED STATES PATENT OFFICE.

HARM H. FRANZEN, OF GOLDEN, ILLINOIS.

BROADCAST HAND-SEEDER.

SPECIFICATION forming part of Letters Patent No. 490,956, dated January 31, 1893.

Application filed October 19, 1892. Serial No. 449,354. (No model.)

*To all whom it may concern:*

Be it known that I, HARM H. FRANZEN, of Golden, in the county of Adams and State of Illinois, have invented a new and Improved Broadcast Hand-Seeder, of which the following is a full, clear, and exact description.

My invention relates to an improvement in broadcast hand seeders, and has for its object to improve upon the construction of such seeders as are shown for example in the patent to B. F. Keeney, No. 429,454, dated June 3, 1890, the improvements consisting primarily in providing the apparatus with a long sowing spout, and constructing that spout in sections, which sections may be telescopic or disconnected entirely one from the other, thus facilitating the storage and transportation of the device.

A further feature consists in placing barriers at or near the end of the outermost section, said barriers serving to deflect and scatter the seed when leaving the sowing spout, and preventing the seed from falling in mass at any point.

Another feature of the invention consists in locating within a rear section of the sowing spout, close to the receptacle containing the seed, a valve through the medium of which the quantity of seed passing from the receptacle to the spout may be conveniently regulated, and the valve is so placed that but little seed will remain in the spout; in fact, only that quantity which should be supplied thereto to be sown. Thus the spout is rendered quite light and the operator may handle it without becoming unduly tired, as is the case where the spout is at all times practically filled with seed.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1 is a perspective view of the device; Fig. 2 is an enlarged longitudinal section, taken through the outer end of the outer section of the sowing spout, and Fig. 3 is an outer end view of the outer section of the spout; Fig. 4 is an outer end view of the section of the spout which is attached to the seed receptacle, illustrating the valve in front elevation; Fig. 5 is a vertical longitudinal section through the spout section carrying the valve; Fig. 6 is an end view of the spout section shown in Figs. 4 and 5, the valve being removed and the partition upon which the valve works being visible; and Fig. 7 is a side elevation of the sections of the spout in telescopic order.

In carrying out the invention a bag A, is usually employed, in which the seed to be sown is placed. This bag is carried upon the person of the operator through the medium of an attached strap B, which is passed over the shoulder in a position to bring the bag at one side of the sower. This bag at its bottom portion has attached thereto a nozzle C, and this nozzle is adapted to constitute a portion of the sowing spout C' to be hereinafter described. The nozzle C, is firmly attached to the bag, and is in direct communication with its interior; and furthermore, the nozzle is made quite short and is provided in its forward end with a valve 10. This valve is given an exterior shape corresponding to the interior contour of the nozzle, which is perfectly circular, as shown in Fig. 4, and in the periphery of the valve a recess 11, is cut, forming an opening in the marginal portion of the disk. The valve is centered and turns upon a correspondingly shaped partition or plate 12, the plate or partition being rigidly secured at its margin to the inner wall of the nozzle C. The plate or partition 12, is likewise provided with an opening 13 in one portion of its margin, and this opening is adapted to register with the opening 11 in the valve. When the valve opening is brought fully over the partition opening 13 the largest possible quantity of seed will flow from the receptacle A, out through the nozzle; and the quantity of seed to be thus discharged is regulated by the width of the opening in the partition 12, this opening being entirely uncovered, or entirely or partially closed by revolving the valve more or less. The partition adjacent to its opening is provided with a scale 14, and at one edge of the opening in the valve the metal is turned up to form a lip 15, rendering the valve easy to turn, as the lip may be readily grasped by the fingers of the operator; and the amount of seed to be passed through the opening controlled by the valve may be accurately determined by bringing the lipped edge of the valve opening over one of the predetermined score marks of the scale, as shown in Fig. 4. After the valve has been adjusted it is set firmly in its adjusted position through the medium of a set screw 16, which serves as a pivot for the valve, and the set screw is passed through an aperture in the central portion of the partition 12, the wall of the aperture being threaded. Ordinarily the movement of the valve is limited by passing a screw or pin 17 into the partition through a segmental slot 18, made in the valve; and when the screw is brought into engagement with one wall of this slot 18 the opening in the partition is fully uncovered, while when an engagement is effected between the pin and the opposite wall of the slot 18, the opening in the partition will be entirely closed.

The sowing spout C', is constructed in sections, any desired number being employed. In the drawings three sections are illustrated, designated as 19, 20 and 21. The sections are of conical or tapering shape, and are capable of being slid one into the other, as shown in Fig. 7; or the sections may be entirely disconnected if in practice it is found desirable. The outer section 21, has a barrier located at its outer or delivery end. This barrier usually consists of two or more bows 22 of wire, made to cross one another, the ends of the bows being secured to the spout, as shown in Figs. 2 and 3.

It is evident that the device may be packed in a small compass for storage or for transportation; and that the spout may be removed when going to or returning from a field, rendering the device very easy to carry. The spout C' being quite long, and the valve being located near the storage receptacle of the grain, as the spout is turned or thrown from side to side of the operator to sow the seed, the seed in the spout will travel with great force in the direction of the outlet end, and will be impinged upon the barrier 22, which barrier will act to separate the seed, scatter them well, and prevent them from falling in clusters or lumps to the ground. Furthermore the force or speed that the seed attains in passing through the length of the spout enables the operator to scatter the seed over a much greater area than when a short spout is employed.

Another feature of the invention consists in the location of the valve close to the storage receptacle. By thus placing the valve no more seed is contained in the spout than is required for sowing, the bulk of the seed being compelled to remain in the nozzle C, or in the storage bag or receptacle. The valve may be placed if desired at the extreme inner end of the nozzle C, or it may be placed in any one of the sections of the discharge or sowing tube or spout.

Having thus described my invention, I claim as new and desire to secure by Letters Patent,—

1. A broadcast seeder having its nozzle provided with an internal transverse partition having an opening 13, a disk having a central set screw binding it adjustably to the partition and having a peripheral recess 11 and a thumb piece 15, substantially as set forth.

2. A broadcast seeder having its nozzle C provided with an internal transverse partition 12 having an opening 13, a disk 10 having a central set screw 16 securing it adjustably to the partition, a peripheral recess 11 terminating at one end in the finger piece 15, and a curved slot 18, and the limit pin or screw 17 extending through said slot into the partition, substantially as set forth—

3. A broadcast seeder having its nozzle provided at its inner end with an internal partition 12 having an opening 13, the centrally pivoted valve having a peripheral recess, and the crossed wires 22 at the outer end of the nozzle, substantially as set forth.

HARM H. FRANZEN.

Witnesses:
WEERT. J. BUSS,
EKKE H. DETMERS.